(12) United States Patent
Yalcin et al.

(10) Patent No.: US 10,590,265 B2
(45) Date of Patent: Mar. 17, 2020

(54) POLY (METHYLPENTENE) COMPOSITION INCLUDING HOLLOW GLASS MICROSPHERES AND METHOD OF USING THE SAME

(71) Applicant: 3M INNOVATIVE PROPERTIES COMPANY, St. Paul, MN (US)

(72) Inventors: Baris Yalcin, Roswell, GA (US); Robert W. Hunter, Burnsville, MN (US); Ibrahim S. Gunes, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 438 days.

(21) Appl. No.: 15/109,373

(22) PCT Filed: Dec. 29, 2014

(86) PCT No.: PCT/US2014/072471
§ 371 (c)(1),
(2) Date: Jun. 30, 2016

(87) PCT Pub. No.: WO2015/103096
PCT Pub. Date: Jul. 9, 2015

(65) Prior Publication Data
US 2016/0326351 A1 Nov. 10, 2016

Related U.S. Application Data

(60) Provisional application No. 61/921,831, filed on Dec. 30, 2013.

(51) Int. Cl.
*C08K 7/28* (2006.01)
*C08L 23/20* (2006.01)
(Continued)

(52) U.S. Cl.
CPC ............... *C08K 7/28* (2013.01); *C08J 9/122* (2013.01); *C08J 9/32* (2013.01); *C08L 23/0815* (2013.01);
(Continued)

(58) Field of Classification Search
CPC .... C08K 7/28; C08J 9/122; C08J 9/32; C08L 23/0815; C08L 23/20; C08L 51/06; C09K 8/80
(Continued)

(56) References Cited

U.S. PATENT DOCUMENTS 2,978,340 A 4/1961 Veatch
3,030,215 A 4/1962 Veatch
(Continued)

FOREIGN PATENT DOCUMENTS

CN 101775173 7/2010
GB 2214186 8/1989
(Continued)

OTHER PUBLICATIONS

Arkles, "Silane Coupling Agents: Connecting Across Boundaries", 2006, 60 pages.
(Continued)

*Primary Examiner* — David T Karst

(57) ABSTRACT

A composition includes poly(4-methylpent-1-ene) and hollow glass microspheres. The composition has a density of less than 0.8 grams per cubic centimeter. Articles made from the composition and methods of making an article by injection molding the composition are also disclosed.

20 Claims, 2 Drawing Sheets

(51) Int. Cl.
*C08L 23/08* (2006.01)
*C08L 51/06* (2006.01)
*C08J 9/32* (2006.01)
*C08J 9/12* (2006.01)
*C09K 8/80* (2006.01)
*E21B 43/267* (2006.01)

(52) U.S. Cl.
CPC ............ *C08L 23/20* (2013.01); *C08L 51/06* (2013.01); *C09K 8/80* (2013.01); *E21B 43/267* (2013.01); *C08J 2203/06* (2013.01); *C08J 2203/08* (2013.01); *C08J 2205/044* (2013.01); *C08J 2323/20* (2013.01); *C08J 2423/08* (2013.01); *C08J 2423/26* (2013.01)

(58) Field of Classification Search
USPC ........................................................ 523/130
See application file for complete search history.

(56) References Cited

U.S. PATENT DOCUMENTS

| | | | |
|---|---|---|---|
| 3,129,086 A | 4/1964 | Veatch | |
| 3,230,064 A | 1/1966 | Veatch | |
| 3,351,495 A * | 11/1967 | Larsen | H01M 2/1653 210/500.36 |
| 3,365,315 A | 1/1968 | Beck | |
| 4,243,575 A | 1/1981 | Myers | |
| 4,391,646 A | 7/1983 | Howell | |
| 4,692,480 A | 9/1987 | Takahashi | |
| 4,767,726 A | 8/1988 | Marshall | |
| 4,923,520 A | 5/1990 | Anzai | |
| 5,695,851 A | 12/1997 | Watanabe | |
| 6,455,630 B1 | 9/2002 | Rigosi | |
| 6,491,984 B2 | 12/2002 | Rigosi | |
| 6,586,073 B2 | 7/2003 | Perez | |
| 6,753,080 B1 | 6/2004 | Sebastian | |
| 7,066,262 B2 | 6/2006 | Funkhouser | |
| 7,365,144 B2 | 4/2008 | Ka | |
| 7,658,794 B2 | 2/2010 | Gleeson | |
| 9,006,302 B2 | 4/2015 | Amos | |
| 2004/0033905 A1* | 2/2004 | Shinbach | C09K 8/03 507/100 |
| 2006/0105053 A1 | 5/2006 | Marx | |
| 2006/0122049 A1 | 6/2006 | Marshall | |
| 2007/0104943 A1 | 5/2007 | D'Souza | |
| 2007/0116942 A1 | 5/2007 | D'Souza | |
| 2007/0155858 A1 | 7/2007 | Israelson | |
| 2007/0299160 A1 | 12/2007 | Delanaye | |
| 2009/0117453 A1* | 5/2009 | Kikuchi | B32B 27/32 429/145 |
| 2011/0130506 A1 | 6/2011 | Lee | |

FOREIGN PATENT DOCUMENTS

| | | |
|---|---|---|
| JP | 6284496 | 10/1994 |
| WO | WO 2004-016707 | 2/2004 |
| WO | WO 2011-160183 | 12/2011 |
| WO | WO 2012-151178 | 11/2012 |
| WO | WO 2013-138158 | 9/2013 |
| WO | WO 2014-008123 | 1/2014 |
| WO | WO 2015-103099 | 7/2015 |

OTHER PUBLICATIONS

Seymour, "Origin and Early Development of Rubber-Toughened Plastics", Rubber-Toughened Plastics, American Chemical Society, 1989, pp. 1-13.

Yalcin, "Polymer Composites with Hollow Glass Microspheres: Processing, Properties and Applications", Advanced Materials Division, 3M Industrial Business Group, 2012, pp. 1-59.

International Search Report for PCT International Application No. PCT/US2014/072471, dated Mar. 26, 2015, 3 pages.

* cited by examiner ure (US 10,590,265 B2)

POLY (METHYLPENTENE) COMPOSITION INCLUDING HOLLOW GLASS MICROSPHERES AND METHOD OF USING THE SAME

CROSS-REFERENCE TO RELATED APPLICATION

This application is a national stage filing under 35 U.S.C. 371 of PCT/US2014/072471, which claims priority to U.S. Provisional Application No. 61/921,831, filed Dec. 30, 2013, the disclosure of which is incorporated by reference in its entirety herein.

BACKGROUND

Hollow glass microspheres having an average diameter of less than about 500 micrometers, also commonly known as "glass microbubbles", "glass bubbles", "hollow glass beads", or "glass balloons" are widely used in industry, for example, as additives to polymeric compositions. In many industries, hollow glass microspheres are useful, for example, for lowering weight and improving processing, dimensional stability, and flow properties of a polymeric composition. Generally, it is desirable that the hollow glass microspheres be strong enough to avoid being crushed or broken during processing of the particular polymeric compound. Hollow glass microspheres have been incorporated into poly(4-methylpent-1-ene) compositions for an acoustic diaphragm in Japanese Pat. No 06-284496, published 1994.

SUMMARY

The present disclosure provides very low-density compositions that include poly(4-methylpent-1-ene) and hollow glass microspheres.

In one aspect, the present disclosure provides a composition including poly(4-methylpent-1-ene) and hollow glass microspheres. The composition has a density of less than 0.8 grams per cubic centimeter.

In another aspect, the present disclosure provides an article including such a composition, typically, when it is solidified.

In another aspect, the present disclosure provides a method of making an article. The method includes injection molding the composition described above to make the article.

In some embodiments, the compositions according to the present disclosure and articles made from them display an advantageous and unexpected combination of very low density, high isostatic pressure resistance, (e.g., at least twice that of the hollow glass microspheres measured by themselves), and low viscosity as measured by a high melt flow rate. This combination of properties was not achieved with polypropylene, another low density thermoplastic, as shown in the Examples, below.

In some embodiments, the compositions according to the present disclosure and articles made from them not only display very low density but also exhibit quick volume loss above a threshold isostatic pressure. Such behavior can be useful, for example, for pressure release or signaling a pressure build-up in various applications.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated (e.g., 1 to 5 includes 1, 1.5, 2, 2.75, 3, 3.80, 4, 5, etc.).

The term "crosslinked" refers to joining polymer chains together by covalent chemical bonds, usually via crosslinking molecules or groups, to form a network polymer. Therefore, a chemically non-crosslinked polymer is a polymer that lacks polymer chains joined together by covalent chemical bonds to form a network polymer. A crosslinked polymer is generally characterized by insolubility, but may be swellable in the presence of an appropriate solvent. A non-crosslinked polymer is typically soluble in certain solvents and is typically melt-processable. A polymer that is chemically non-crosslinked may also be referred to as a linear polymer.

A "polar functional group" is a functional group that includes at least one atom that is more electronegative than carbon. Common elements of organic compounds that are more electronegative than carbon are oxygen, nitrogen, sulfur, and halogens. In some embodiments, a polar functional group is a functional group that includes at least one oxygen atom. Such groups include hydroxyl and carbonyl groups (e.g., such as those in ketones, aldehydes, carboxylic acids, carboxyamides, carboxylic acid anhydrides, and carboxylic acid esters).

The above summary of the present disclosure is not intended to describe each disclosed embodiment or every implementation of the present disclosure. The description that follows more particularly exemplifies illustrative embodiments. It is to be understood, therefore, that the following description should not be read in a manner that would unduly limit the scope of this disclosure.

DETAILED DESCRIPTION

Figure 1:
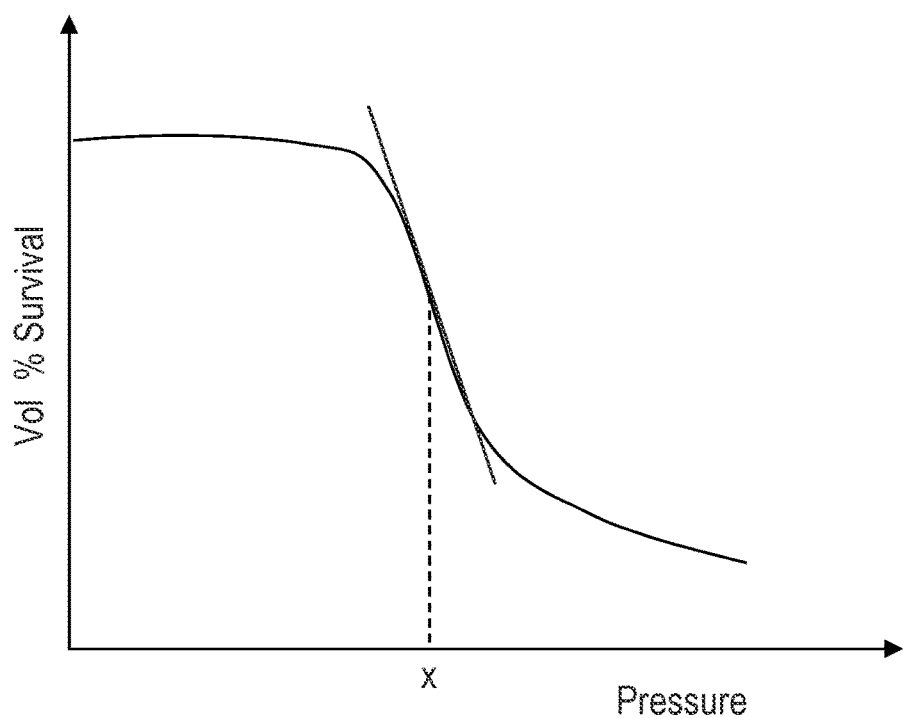
FIG. 1 is a graph of volume loss vs. pressure used to measure isostatic pressure resistance for a sample in the Examples.

Compositions according to the present disclosure include poly(4-methylpent-1-ene), which has a density of 0.825 grams per cubic centimeter. Poly(4-methylpent-1-ene), abbreviated hereinafter as PMP is available commercially, for example, from Mitsui Chemicals, Inc., Tokyo, Japan, under the trade designation "TPX".

Compositions according to the present disclosure also include hollow glass microspheres. Hollow glass microspheres useful in the compositions and methods according to the present disclosure can be made by techniques known in the art (see, e.g., U.S. Pat. No. 2,978,340 (Veatch et al.); U.S. Pat. No. 3,030,215 (Veatch et al.); U.S. Pat. No. 3,129,086 (Veatch et al.); and U.S. Pat. No. 3,230,064 (Veatch et al.); U.S. Pat. No. 3,365,315 (Beck et al.); U.S. Pat. No. 4,391,646 (Howell); and U.S. Pat. No. 4,767,726 (Marshall); and U. S. Pat. App. Pub. No. 2006/0122049 (Marshall et. al). Techniques for preparing hollow glass microspheres typically include heating milled frit, commonly referred to as "feed", which contains a blowing agent (e.g., sulfur or a compound of oxygen and sulfur). Frit can be made by heating mineral components of glass at high temperatures until molten glass is formed.

Although the frit and/or the feed may have any composition that is capable of forming a glass, typically, on a total weight basis, the frit comprises from 50 to 90 percent of $SiO_2$, from 2 to 20 percent of alkali metal oxide, from 1 to 30 percent of $B_2O_3$, from 0.005-0.5 percent of sulfur (for example, as elemental sulfur, sulfate or sulfite), from 0 to 25 percent divalent metal oxides (for example, CaO, MgO, BaO, SrO, ZnO, or PbO), from 0 to 10 percent of tetravalent metal oxides other than $SiO_2$ (for example, $TiO_2$, $MnO_2$, or $ZrO_2$), from 0 to 20 percent of trivalent metal oxides (for example, $Al_2O_3$, $Fe_2O_3$, or $Sb_2O_3$), from 0 to 10 percent of oxides of pentavalent atoms (for example, $P_2O_5$ or $V_2O_5$), and from 0 to 5 percent fluorine (as fluoride) which may act as a fluxing agent to facilitate melting of the glass composition. Additional ingredients are useful in frit compositions and can be included in the frit, for example, to contribute particular properties or characteristics (for example, hardness or color) to the resultant glass bubbles.

In some embodiments, the hollow glass microspheres useful in the compositions and methods according to the present disclosure have a glass composition comprising more alkaline earth metal oxide than alkali metal oxide. In some of these embodiments, the weight ratio of alkaline earth metal oxide to alkali metal oxide is in a range from 1.2:1 to 3:1. In some embodiments, the hollow glass microspheres have a glass composition comprising $B_2O_3$ in a range from 2 percent to 6 percent based on the total weight of the glass bubbles. In some embodiments, the hollow glass microspheres have a glass composition comprising up to 5 percent by weight $Al_2O_3$, based on the total weight of the hollow glass microspheres. In some embodiments, the glass composition is essentially free of $Al_2O_3$. "Essentially free of $Al_2O_3$" may mean up to 5, 4, 3, 2, 1, 0.75, 0.5, 0.25, or 0.1 percent by weight $Al_2O_3$. Glass compositions that are "essentially free of $Al_2O_3$" also include glass compositions having no $Al_2O_3$. Hollow glass microspheres useful for practicing the present disclosure may have, in some embodiments, a chemical composition wherein at least 90%, 94%, or even at least 97% of the glass comprises at least 67% $SiO_2$, (e.g., a range of 70% to 80% $SiO_2$), as range of 8% to 15% of an alkaline earth metal oxide (e.g., CaO), a range of 3% to 8% of an alkali metal oxide (e.g., $Na_2O$), a range of 2% to 6% $B_2O_3$, and a range of 0.125% to 1.5% $SO_3$. In some embodiments, the glass comprises in a range from 30% to 40% Si, 3% to 8% Na, 5% to 11% Ca, 0.5% to 2% B, and 40% to 55% O, based on the total of the glass composition.

The "average true density" of hollow glass microspheres is the quotient obtained by dividing the mass of a sample of hollow glass microspheres by the true volume of that mass of hollow glass microspheres as measured by a gas pycnometer. The "true volume" is the aggregate total volume of the hollow glass microspheres, not the bulk volume. The average true density of the hollow glass microspheres useful for practicing the present disclosure is generally at least 0.20 grams per cubic centimeter (g/cc), 0.25 g/cc, or 0.30 g/cc. In some embodiments, the hollow glass microspheres useful for practicing the present disclosure have an average true density of up to about 0.65 g/cc. "About 0.65 g/cc" means 0.65 g/cc±five percent. In some of these embodiments, to efficiently lower the density of the composition, the average true density of the hollow glass microspheres is up to 0.5 g/cc or less than 0.5 g/cc. For example, the average true density of the hollow glass microspheres disclosed herein may be in a range from 0.2 g/cc to 0.65 g/cc, 0.2 g/cc to 0.5 g/cc, 0.2 g/cc to 0.49 g/cc, 0.3 g/cc to 0.50 g/cc, 0.3 g/cc to 0.49 g/cc, or 0.3 g/cc to 0.48 g/cc. Hollow glass microspheres having any of these densities can be useful for towering the density of the composition according to the present disclosure.

For the purposes of this disclosure, average true density is measured using a pycnometer according to ASTM D2840-69, "Average True Particle Density of Hollow Microspheres". The pycnometer may be obtained, for example, under the trade designation "ACCUPYC 1330 PYCNOMETER" from Micromeritics, Norcross, Ga., or under the trade designations "PENTAPYCNOMETER" or "ULTRAPYCNOMETER 1000" from Formanex, Inc., San Diego, Calif. Average true density can typically be measured with an accuracy of 0.001 g/cc. Accordingly, each of the density values provided above can be ±five percent.

A variety of sizes of hollow glass microspheres may be useful. As used herein, the term size is considered to be equivalent with the diameter and height of the hollow glass microspheres. In some embodiments, the hollow glass microspheres can have a median size by volume in a range from 14 to 45 micrometers (in some embodiments from 15 to 40 micrometers, 20 to 45 micrometers, or 20 to 40 micrometers). The median size is also called the D50 size, where 50 percent by volume of the hollow glass microspheres in the distribution are smaller than the indicated size. For the purposes of the present disclosure, the median size by volume is determined by laser light diffraction by dispersing the hollow glass microspheres in deaerated, deionized water. Laser light diffraction particle, size analyzers are available, for example, under the trade designation "SATURN DIGISIZER" from Micromeritics. The size distribution of the hollow glass microspheres useful for practicing the present disclosure may be Gaussian, normal, or non-normal. Non-normal distributions may be unimodal or multi-modal (e.g., bimodal).

The hollow glass microspheres useful in the compositions and methods according to the present disclosure typically need to be strong enough to survive the injection molding process. A useful isostatic pressure at which ten percent by volume of the hollow glass microspheres collapses is at least about 17 (in some embodiments, at least about 20, 38, 50, or 55) Megapascals (MPa). "About 17 MPa" means 17 MPa±five percent. In some embodiments, a isostatic pressure at which ten percent by volume of the hollow glass microspheres collapses can be at least 100, 110, or 120 MPa. In some embodiments, a isostatic pressure at which ten percent, or twenty percent, by volume of the hollow glass microspheres collapses is up to 250 (in some embodiments, up to 210, 190, or 170) MPa. The isostatic pressure at which ten percent by volume of hollow glass microspheres collapses may be in a range from 17 MPa to 250 MPa, 38 MPa to 210 MPa, 50 MPa to 210 MPa, or 70 MPa to 250 MPa. For the purposes of the present disclosure, the collapse strength of the hollow glass microspheres is measured on a dispersion of the hollow glass microspheres in glycerol using ASTM D3102-72 "Hydrostatic Collapse Strength of Hollow Glass Microspheres"; with the exception that the sample size (in grams) is equal to 10 times the density of the glass bubbles. Collapse strength can typically be measured with an accuracy of ± about five percent. Accordingly, each of the collapse strength values provided above can be ±five percent.

It should be understood by a person skilled in the art that not all hollow glass microspheres with the same density have the same collapse strength and that an increase in density does not always correlate with an increase in collapse strength. As described in the Examples below, one hollow glass microsphere that was incorporated into PMP had an average true density of 0.46 g/cc and a collapse strength of 16,000 psi (110 MPa), and another hollow glass microsphere that was incorporated into PMP had an average true density of 0.46 g/cc and a collapse strength of 6000 psi (41 MPa). It is therefore evident that a person skilled in the art would not know the collapse strength of a hollow glass microsphere from the density alone.

Hollow glass microspheres useful for practicing the present disclosure can be obtained commercially and include those marketed by 3M Company, St. Paul, Minn., under the trade designation "3M GLASS BUBBLES" (e.g., grades K1, K15, S15, S22, K20, K25, S32, K37, S38, S38HS, S38XHS, K46, A16/500, A20/1000, D32/4500, H50/10000, S60, S60HS, iM30K, iM16K, S38HS, S38XHS, K42HS, K46, and H50/10000). Other suitable hollow glass microspheres can be obtained, for example, from Potters Industries, Valley Forge, Pa., (an affiliate of PQ Corporation) under the trade designations "SPHERICEL HOLLOW GLASS SPHERES" (e.g., grades 110P8 and 60P18) and "Q-CEL HOLLOW SPHERES" (e.g., grades 30, 6014, 6019, 6028, 6036, 6042, 6048, 5019, 5023, and 5028), from Silbrico Corp., Hodgkins, Ill. under the trade designation "SIL-CELL" (e.g., grades SIL 35/34, SIL-32, SIL-42, and SIL-43), and from Sinosteel Maanshan Inst. of Mining Research Co., Maanshan, China, under the trade designation "Y8000".

Although the glass microspheres available from Zeelan Industries, Inc. under the trade designation "ZEEOSPHERES 200" are referred to in UK Pat. Appl. (GB2214186, published Aug. 31, 1989, as hollow, glass microspheres, such microspheres are thick-walled heads typically having a density of about 2.5 g/cc. Therefore, such glass microspheres are not capable of providing a composition according to the present disclosure having a density of less than 0.8 g/cc.

The hollow glass microspheres are present in the composition disclosed herein at a level of at least 10 percent by weight, based on the total weight of the composition. In some embodiments, the hollow glass microspheres are present in the composition at least at 10, 15, or 20 percent by weight based on the total weight of the composition. In some embodiments, the hollow glass microspheres are present in the composition at a level of up to 35, 30, or 25 percent by weight, based on the total weight of the composition. For example, the hollow glass microspheres may be present in the composition in a range from 10 to 35, 15 to 35, or 20 to 35 percent by weight, based on the total weight of the composition.

The composition according to the present disclosure, including the PMP and the hollow glass microspheres, has a density of less than 0.8 g/cc. In some embodiments, the composition has a density of up to 0.79 g/cc, 0.78 g/cc, 0.77 g/cc, 0.76 g/cc, or 0.75 g/cc. Typically the composition has a density of at least 0.65 g/cc, 0.66 g/cc, or 0.67 g/cc. The compositions may have a density in a range, for example, from 0.65 g/cc to 0.79 g/cc, 0.65 g/cc to 0.75 g/cc, or 0.67 g/cc to 0.75 g/cc.

Typically, and surprisingly, in some embodiments, compositions according to the present disclosure an isostatic pressure resistance with less than five percent volume loss at least twice the isostatic pressure at which ten percent by volume of the hollow glass microspheres collapses. In some embodiments, the isostatic pressure resistance with less than five percent volume loss of the composition disclosed herein is more than twice or 2.5 times the isostatic pressure at which ten percent by volume of the hollow glass microspheres collapses. Compositions with an isostatic pressure resistance greater than the isostatic crush strength of the hollow glass microspheres is even possible when the hollow glass microspheres are present in an amount of about 30 percent by weight, or about 40 percent by volume, or more, based on the weight or volume of the composition. As shown in the Examples, below, the composite of Example 3 resists greater than 170 MPa of isostatic pressure without any volume loss with more than 90% hollow glass microsphere survival. Since the isostatic crush strength of the hollow glass microsphere used in Example 3 is around 110 MPA for 90% survival, it is believed the PMP matrix reinforces the composite and increases the compressive isostatic pressure resistance.

In some embodiments, the composition according to the present disclosure further comprises a polyolefin compatibilizer modified with polar functional groups. Suitable compatibilizers include those made from monomers having the general structure $CH_2=CHR^{10}$, wherein $R^{10}$ is a hydrogen or alkyl. In some embodiments, $R^{10}$ having up to 10 carbon atoms or from one to six carbon atoms. The repeating units of such polyolefins would have the general formula $—[CH_2—CHR^{10}]—$, wherein $R^{10}$ is defined as in any of the aforementioned embodiments. Examples of suitable polyolefin backbones for the compatibilizer include polyethylene; polypropylene; poly (1-butene); poly (3-methylbutene; poly (4-methylpentene); copolymers of ethylene with propylene; 1-butene, 1-hexene, 1-octene, 1-decene, 4-methyl-1-pentene, and 1-octadecene; and blends of polyethylene and polypropylene. Typically, the compatibilizer is based on at least one of a polyethylene or polypropylene backbone. It should be understood that a polyolefin comprising polyethylene may be a polyethylene homopolymer or a copolymer containing ethylene repeating units. Similarly, it should be understood that a polyolefin comprising polypropylene may be a polypropylene homopolymer or a copolymer containing propylene repeating units. The polyolefin compatibilizer may also be part a blend of different polyolefins that includes at least one of polypropylene or polyethylene. The compatibilizer also includes repeating units modified with polar functional groups. In some embodiments, the polar functional groups include maleic anhydride, carboxylic acid groups, and hydroxyl groups. In some embodiments, the compatibilizer is a maleic anhydride-modified polyolefin (e.g., amaleic anhydride-modified polypropylene or maleic anhydride-modified polyethylene). In some embodiments, compatibilizer is present in the composition in an amount greater than two percent, based on the total weight of the composition. In some embodiments, compatibilizer is present in the composition in amount of at least 2.5, 3, or 3.5 percent, based on the total weight of the composition. In some embodiments, compatibilizer is present in the composition in amount of up to 4 or 5 percent, based on the total weight of the composition.

In some embodiments, the composition according to the present disclosure further comprises an impact modifier. In some embodiments, the impact modifier also is a polyolefin, is chemically non-crosslinked, and is free of polar functional groups. For example, the impact modifier is free of any of the polar functional groups described above in connection with the compatibilizer. In some embodiments, the impact modifier includes only carbon-carbon and carbon-hydrogen bonds. In some embodiments, the polyolefin impact modifier is an ethylene propylene elastomer, an ethylene octene elastomer, an ethylene propylene diene elastomer, an ethylene propylene octene elastomer, polybutadiene, a butadiene copolymer, polybutene, or a combination thereof. In some embodiments, the polyolefin impact modifier is an ethylene octene elastomer.

The impact modifier may be selected to have a relatively low viscosity as measured by melt flow index. A combination of impact modifiers having different melt flow indexes may also be useful. In some embodiments, at least one of the polyolefin impact modifiers has a melt flow index at 190° C. and 2.16 kilograms of at least 10 grams per 10 minutes (in some embodiments, at least 11, 12, or 13 grams per 10 minutes). The melt flow index of the impact modifiers is measured by ASTM D1238-13: Standard Test Method for Melt Flow Rates of Thermoplastics by Extrusion Plastometer.

Other common types of impact modifiers such as ground rubber, core-shell particles, functionalized elastomers available, for example, from Dow Chemical Company, Midland, Mich., under the trade designation "AMPLIFY GR-216", and particles available, for example, from Akzo Nobel, Amsterdam, The Netherlands, under the trade designation "EXPANCEL" are at least one of chemically crosslinked or functionalized. However, many of these impact modifiers increase the viscosity of a composition, making the composition less suitable for some polymer processing techniques (e.g., injection molding). In addition, "EXPANCEL" particles and similar particles require more strict thermal control and more precise handling than the polyolefin impact modifiers described herein, which can present challenges during processing.

The impact modifier can be added to the composition according to the present disclosure in all amount sufficient to improve the impact strength of the composition. In some embodiments, impact modifier is present in the composition in a range from 10 percent to 20 percent, based on the total weight of the composition. In some embodiments, impact modifier is present in the composition in amount of at least 14, 15, or 16 percent and up to about 20 percent, based on the total weight of the composition.

Typically, in some embodiments in which the composition according to the present disclosure further comprises an impact modifier and a polyolefin compatibilizer modified with polar functional groups, the composition has an isostatic pressure resistance with at least 25 percent volume loss substantially the same as the isostatic pressure at which ten percent by volume of the hollow glass microspheres collapses. When it is said that the isostatic pressure resistance is substantially the same as the isostatic pressure at which the hollow glass microspheres collapse, it means that the isostatic pressure resistance can be within 10%, 5%, 2.5%, or 1% of the isostatic pressure at which the hollow glass microspheres collapse. In these embodiments, the volume loss of at least 25 percent typically occurs in a narrow pressure range, for example, a range of 14 MPa, 7 MPa, 4 MPa, or 3 MPa. The isostatic pressure resistance with at least 25 percent volume loss can occur is any range described above for the collapse strength of the hollow glass microspheres described above. A useful isostatic pressure resistance may be in a range, for example, between 100 MPa and 140 MPa. Advantageously, the threshold isostatic pressure at which a composition exhibits quick volume loss may be tailored as desired for a particular application by selection of hollow glass microspheres and the addition of any compatibilizer and impact modifier.

The composition according to the present disclosure and/or useful for practicing the method disclosed herein, which includes PMP, the hollow glass microspheres, and optionally the compatibilizer and impact modifier as described above in any of their embodiments has a melt flow index that renders it suitable for injection molding. Typically, the composition has a melt flow index at 190° C. and 2.16 kilograms of at least 5 grams per 10 minutes (in some embodiments, at least 10, 15, 20, 25, 30, 35, 40, or 50 grams per 10 minutes). The melt flew index of the composition is measured by ASTM D 1238-13: Standard Test Method for Melt flow Rates of Thermoplastics by Extrusion Plastometer.

Compositions according to the present disclosure are suitable for injection molding. Accordingly, the present disclosure provides a method of making an article by injection molding of a composition disclosed herein. Elevated temperatures (e.g., in a range from 100° C. to 225° C.) may be useful for mixing the components of the composition in an extruder. In some embodiments, hollow glass microspheres may be added to the composition after the polyolefin, compatibilizer, and impact modifier are combined. The method of injection molding the composition disclosed herein can utilize any type of injection molding equipment, generally including a material hopper (e.g., barrel), a plunger (e.g., injection ram or screw-type), and a heating unit.

In some embodiments, the PMP in the composition according to the present disclosure is microcellular. This means the PMP is porous. The term "microcellular" typically refers to pore sizes from 0.1 micrometer to 100 micrometers. In some embodiments, the articles formed from the microcellular compositions exhibit pore sizes in a range from 0.1 micrometer to 200 micrometers, in some embodiments, in a range from 0.1 micrometer to 100 micrometers or, in some embodiments, in a range from 0.1 micrometer to 30 micrometers. Providing PMP can be achieved, for example, through controlled use of a fluid in its supercritical state during extrusion or injection molding of a composition disclosed herein. The term "supercritical fluid" refers to any substance at a temperature and pressure above its critical point, where distinct liquid and gas phases do not exist. Useful fluids may include $CO_2$, $N_2$, water, and argon.

In some embodiments, the method of making an article disclosed herein includes feeding the composition disclosed herein into a microcellular foam injection molding machine, injecting a supercritical fluid into the composition, blending the composition and the supercritical fluid at high pressure to form a blend, and injecting the blend into a molding tool. In some embodiments, the supercritical fluid is essentially $CO_2$ or $N_2$ in its supercritical fluid state.

The creation of the single-phase solution, in which the supercritical fluid is fully dissolved and uniformly dispersed in the molten polymer, in some embodiments, takes place inside the injection barrel under carefully controlled process conditions. The supercritical fluid may be mass flow metered into the polymer for a fixed amount of time. During that dosing period, the right conditions of temperature, pressure and shear are established within the barrel. Back-pressure, screw-speed and barrel-temperature control, as well as the geometry of the mixing screw and supercritical fluid injector, all play a role in establishing the process conditions that mate the single-phase solution.

To impart a microcellular structure to molded parts, the microcellular foaming process typically relies on the homogeneous cell nucleation that occurs when a single-phase solution of polymer and supercritical fluid passes through an injection gate and into a mold cavity. The addition of supercritical fluid to the molten polymer pressurizes the solution, and the pressure drop as the solution enters the mold allows the supercritical fluid to create cell nuclei. The cells then grow until the material fills the mold, the expansion capabilities of the supercritical fluid are expended, or the flow front freezes.

An apparatus for making a microcellular composition may be, for instance, a "MUCELL" enabled injection molding machine available, for example, from Engle, Guelph, Ontario, Canada. "MUCELL" is a registered trademark of Trexel, Inc., Wilmington, Mass.

Further details about composite materials comprising hollow glass microspheres and a microcellular thermoplastic resin and methods of making them can be found in Int. Pat. Appl. Pub. No. WO2013/138158 (Gunes et al.).

In some embodiments of the composition according to the present disclosure, the hollow glass microspheres may be treated with a coupling agent to enhance the interaction between the hollow glass microspheres and the polyolefin matrix. In other embodiments, a coupling agent can be added directly to the composition. Examples of useful coupling agents include zirconates, silanes, or titanates. Typical titanate and zirconate coupling agents are known to those skilled in the art and a detailed overview of the uses and selection criteria for these materials can be found in Monte, S. J., Kenrich Petrochemicals, Inc., "Ken-React® Reference Manual—Titanate, Zirconate and Aluminate Coupling Agents", Third Revised Edition, March, 1995. If used, coupling agents are commonly included in an amount of about 1% to 3% by weight, based on the total weight of the hollow glass microspheres in the composition.

Suitable silanes are coupled to glass surfaces through condensation reactions to form siloxane linkages with the siliceous glass. This treatment renders the filler more wettable or promotes the adhesion of materials to the hollow glass microsphere surface. This provides a mechanism to bring about covalent, ionic or dipole bonding between hollow glass microspheres and organic matrices. Silane coupling agents are chosen based on the particular functionality desired. Another approach to achieving intimate hollow glass microsphere-polymer interactions is to functionalize the surface of microsphere with a suitable coupling agent that contains a polymerizable moiety, thus incorporating the material directly into the polymer backbone. Examples of polymerizable moieties are materials that contain olefinic functionality such as styrenic, vinyl (e.g., vinyltriethoxysilane, vinyltri(2-methoxyethoxy) silane), acrylic and methacrylic moieties (e.g., 3-metacryloxypropyltrimethoxysilane). Examples of useful silanes that may participate in vulcanization crosslinking include 3-mercaptopropyltrimethoxysilane, bis(triethoxysilipropyl)tetrasulfane (e.g., available under the trade designation "SI-69" from Evonik Industries, Wesseling, Germany), and thiocyanatopropyltriethoxysilane. Still other useful silane coupling agents may have amino functional groups (e.g., N-2-(aminoethyl)-3-aminopropyltrimethoxysilane and (3-aminopropyl) trimethoxysilane). Coupling, agents useful for peroxide-cured rubber compositions typically include vinyl silanes. Coupling agents useful for sulfur-cured rubber compositions typically include mercapto or polysulfido silanes. Suitable silane coupling strategies are outlined in Silane Coupling Agents: Connecting Across Boundaries, by Barry Arkles, pg 165-189, Gelest Catalog 3000-A Silanes and Silicones: Gelest Inc. Morrisville, Pa.

Although coupling agents are useful in some embodiments, advantageously, the compositions according to the present disclosure provide good mechanical properties even in the absence of coupling agents. Accordingly, in some embodiments, the hollow glass microspheres in the compositions according to the present disclosure are not treated with a silane coupling agent.

In some embodiments, the composition according to and/or useful in the method according to the present disclosure includes one or more stabilizers (e.g., antioxidants or hindered amine light stabilizers (HALS)). Examples of useful antioxidants include hindered phenol-based compounds and phosphoric acid ester-based compounds (e.g., those available from BASF, Florham Park, N.J., under the trade designations "IRGANOX" and "IRGAFOS" such as "IRGANOX 1076" and "IRGAFOS 168", those available from Songwon Ind. Co, Ulsan, Korea, under the trade designations "SONGNOX", and butylated hydroxytoluene (BHT)). Antioxidants, when used, can be present in an amount from about 0.001 to 1 percent by weight based on the total weight of the composition. HALS are typically compounds that can scavenge free-radicals, which can result from photodegradation or other degradation processes. Suitable HALS include decanedioic acid, bis (2,2,6,6-tetramethyl-1-(octyloxy)-4-piperidinyl)ester. Suitable HALS include those available, for example, from BASF under the trade designations "TINUVIN" and "CHIMASSORB". Such compounds, when used, can be present in an amount from about 0.001 to 1 percent by weight based on the total weight of the composition.

Reinforcing filler may be useful in the composition according to and/or useful in the method according to the present disclosure. Reinforcing filler can be useful, for example, for enhancing the tensile, flexural, and/or impact strength of the composition. Examples of useful reinforcing fillers include silica (including nanosilica), other metal oxides, metal hydroxides, and carbon black. Other useful fillers include glass fiber, wollastonite, talc, calcium carbonate, titanium dioxide (including nano-titanium dioxide), wood flour, other natural fillers and fibers (e.g., walnut shells, hemp, and corn silks), and clay (including nano-clay).

However, in some embodiments, the presence of silica in the composition according to the present disclosure can lead to an undesirable increase in the density of the composition. Advantageously, the compositions according to the present disclosure and/or useful in the methods according to the present disclosure provide good mechanical properties even in the absence of reinforcing fillers. As shown in the Examples, below, it has been found that compositions disclosed herein have high tensile, flexural, and impact strength even in the absence of silica filler or other reinforcing filler. Accordingly, in some embodiments, the composition is free of reinforcing filler or contains up to 5, 4, 3, 2, or 1 percent by weight reinforcing filler, based on the total weight of the composition.

Other additives may be incorporated into the composition disclosed herein in any of the embodiments described above. Examples of other additives that may be useful, depending on the intended use of the composition, include preservatives, mixing agents, colorants, dispersants, floating or anti-setting agents flow or processing agents, wetting agents, anti-ozonant, and odor scavengers.

The composition and method according to the present disclosure are useful for making low density articles (e.g., having a density in a range from 0.65 g/cc to 0.79 g/cc, 0.65 g/cc to 0.75 g/cc, or 0.67 g/cc to 0.75 g/cc).

In some embodiments, the article according to the present disclosure is useful as a proppant for a fracturing and propping operation on a gas or oil well. Typically, a proppant is spherical with a size in a range from 100 micrometers to 3000 micrometers (i.e., about 140 mesh to about 5 mesh (ANSI)) (in some embodiments, in a range from 1000 micrometers to 3000 micrometers, 1000 micrometers to 2000 micrometers, 1000 micrometers to 1700 micrometers (i.e., about 1.8 mesh to about 12 mesh), 850 micrometers to 1700 micrometers (i.e., about 20 mesh to about 12 mesh), 850 micrometers to 1200 micrometers (i.e., about 20 mesh to about 16 mesh), 600 micrometers to 1200 micrometers (i.e., about. 30 mesh to about 16 mesh), 425 micrometers to 850 micrometers (i.e., about 40 mesh to about 20 mesh), or 300 micrometers to 600 micrometers (i.e., about 50 mesh to about 30 mesh). The size of the proppant articles desired may depend, for example, on the characteristics of a subterranean formation selected for a fracturing and propping operation.

For an article according to the present disclosure that is spherical, the article will typically meet or exceed the standards for sphericity and roundness as measured according to American Petroleum Institute Method RP56, "Recommended Practices for Testing Sand Used in Hydraulic Fracturing Operations", Section 5, (Second Ed., 1995) (referred to herein as "API RP 56"). As used herein, the terms "sphericity" and "roundness" are defined as described in the API RP's and can be determined using the procedures set forth in the API RP's. In some embodiments, the sphericity of the article disclosed herein is at least 0.6 (in some embodiments, a least 0.7, 0.8 or 0.9). In some embodiments, the roundness of the article is at least 0.6 (in some embodiments, at least 0.7, 0.8, or 0.9).

It may be useful to mix the proppant articles disclosed herein and other particles. The other particles may be conventional proppant materials such as at least one of sand, resin-coated sand, graded nut shells, resin-coated nut shells, sintered bauxite, particulate ceramic materials, glass beads, and particulate thermoplastic materials. Sand particles are available, for example, from Badger Mining Corp., Berlin, Wis.; Borden Chemical, Columbus, Ohio; Fairmont Minerals, Chardon, Ohio. Thermoplastic particles are available, for example, from the Dow Chemical Company, Midland, Mich.; and Baker Hughes, Houston, Tex. Clay-based particles are available, for example, from CarboCeramics, Irving, Tex.; and Saint-Gobain, Courbevoie, France. Sintered bauxite ceramic particles are available, for example, from Borovichi Refractories, Borovichi, Russia; 3M Company, St. Paul, Minn.; CarboCeramics; and Saint Gobain. Glass beads are available, for example, from Diversified Industries, Sidney, British Columbia, Canada; and 3M Company. Generally, the sizes of other particles may be in any of the size ranges described above for the plurality of proppant particles disclosed herein. Mixing other particles (e.g., sand) and the plurality of particles disclosed herein may be useful, for example, for reducing the cost of proppant particles while maintaining at least some of the beneficial properties of the proppant articles disclosed herein.

In some embodiments, the proppant articles disclosed herein are dispersed in a fluid. The fluid may be a carrier fluid useful, for example, for depositing proppant articles into a fracture. A variety of aqueous and non-aqueous carrier fluids can be used with the proppant articles disclosed herein. In some embodiments, the fluid comprises at least one of water, a brine, an alcohol, carbon dioxide (e.g., gaseous, liquid, or supercritical carbon dioxide), nitrogen gas, or a hydrocarbon. In some embodiments, the fluid further comprises at least one of a surfactant, rheological modifier, salt, gelling agent, breaker, scale inhibitor, dispersed gas, or other particles.

Illustrative examples of suitable aqueous fluids and brines include fresh water, sea water, sodium chloride brines, calcium chloride brines, potassium chloride brines, sodium bromide brines, calcium bromide brines, potassium bromide brines, zinc bromide brines, ammonium chloride brines, tetramethyl ammonium chloride brines, sodium formate brines, potassium formate brines, cesium formate brines, and any combination thereof. Rheological modifiers may be added to aqueous fluid to modify the flow characteristics of the fluid, for example. Illustrative examples of suitable water-soluble polymers that can be added to aqueous fluids include guar and guar derivatives such as hydroxypropyl guar (HPG), carboxymethylhydroxypropyl guar (CMHPG), carboxymethyl guar (CMG), hydroxyethyl cellulose (HEC), carboxymethylhydroxyethyl cellulose (CMHEC), carboxymethyl cellulose (CMC), starch based polymers, xanthan based polymers, and biopolymers such as gum Arabic, carrageenan, as well as any combination thereof. Such polymers may crosslink under downhole conditions. As the polymer undergoes hydration and crosslinking, the viscosity of the fluid increases, which may render the fluid more capable of carrying the proppant. Another class of rheological modifier is viscoelastic surfactants ("VES's").

Examples of suitable non-aqueous fluids useful for practicing the present disclosure include alcohols (e.g., methanol, ethanol, isopropanol, and other branched and linear alkyl alcohols); diesel; raw crude oils; condensates of raw crude oils; refined hydrocarbons (e.g., gasoline, naphthalenes, xylenes, toluene and toluene derivatives, hexanes, pentanes, and ligroin); natural gas liquids; gases (e.g., carbon dioxide and nitrogen gas); liquid carbon dioxide; supercritical carbon dioxide; liquid propane; liquid butane; and combinations thereof. Some hydrocarbons suitable for use as such fluids can be obtained, for example, from SynOil, Calgary, Alberta, Canada under the trade designations "PLATINUM", "TG-740", "SF-770", "SF-800", "SF-830", and "SF-840". Mixtures of the above non-aqueous fluids with water (e.g., mixtures of water and alcohol or several alcohols or mixtures of carbon dioxide (e.g., liquid carbon dioxide) and water) may also be useful for practicing the present disclosure. Mixtures can be made of miscible or immiscible fluids. Rheological modifiers (e.g., a phosphoric acid ester) can be useful in non-aqueous fluids as well. In some of these embodiments, the fluid further comprises an activator (e.g., a source of polyvalent metal ions such as ferric sulfate, ferric chloride, aluminum chloride, sodium aluminate, and aluminum isopropoxide) for the gelling agent.

Fluid containing proppant articles according to the present disclosure dispersed therein can also include at least one breaker material (e.g., to reduce viscosity of the fluid once it is in the well). Examples of suitable breaker materials include enzymes, oxidative breakers (e.g., ammonium peroxydisulfate), encapsulated breakers such as encapsulated potassium persulfate (e.g., available, for example, under the trade designation "ULTRAPERM CRB" or "SUPERULTRAPERM CRB", from Baker Hughes), and breakers described in U.S. Pat. No. 7,066,262 (Funkhouser).

Fluids having proppant articles according to the present disclosure dispersed therein may also be foamed. Foamed fluids may contain, for example, nitrogen, carbon dioxide, or mixtures thereof at volume fractions ranging from 10% to 90% of the total fluid volume.

The fluids described above, in any of their embodiments, may be useful, for example, for practicing the method of fracturing a subterranean geological formation penetrated by a wellbore according to the present disclosure. Techniques for fracturing subterranean geological formations comprising hydrocarbons known in the art, as are techniques for introducing proppants into the fractured formation to prop open fracture openings. In some methods, a fracturing fluid is injected into the subterranean geological formation at rates and pressures sufficient to open a fracture therein. When injected at the high pressures exceeding the rock strength, the fracturing fluid opens a fracture in the rock. The fracturing fluid may be an aqueous or non-aqueous fluid having any of the additives described above. Proppant articles described herein can be included in the fracturing fluid. That is, in some embodiments, injecting the fracturing fluid and introducing the proppant articles are carried out simultaneously. In other embodiments, the proppant articles disclosed herein may be present in a second fluid (described in any of the above embodiments) that is introduced into the well after the fracturing fluid is introduced. As used herein, the term "introducing" (and its variants "introduced", etc.) includes pumping, injecting, pouring, releasing, displacing, spotting, circulating, or otherwise placing a fluid or material (e.g., proppant articles) within a well, wellbore, fracture or subterranean formation using any suitable manner known in the art. The proppant articles according to the present disclosure can serve to hold the walls of the fracture apart after the pumping has stopped and the fracturing fluid has leaked off or flowed back. The proppant articles according to the present disclosure may also be useful, for example, in fractures produced by etching (e.g., acid etching). Fracturing may be carried out at a depth, for example, in a range from 500 to 8000 meters, 1000 to 7500 meters, 2500 to 7000 meters, or 2500 to 6000 meters.

Compositions according to the present disclosure may also be useful as syntactic foams for insulation in a variety of applications, for example, for wet insulation applications (i.e., insulation that is exposed to sea water) for off-shore oil pipelines or flowlines. In some embodiments of the article disclosed herein, the article comprises a conduit, which may be surrounded by a composition disclosed herein or contain the composition within. In some embodiments, the conduit is submerged in water (including in an ocean, sea, bay, gulf, lake, or river) at a depth of at least 100 meters (in some embodiments, at least 500 meters, 1000 meters, 1500 meters, 2000 meters, 2500 meters, 3000 meters, or even at least 3500 meters). The conduit may also contain at least oil within. Examples of structures that may be insulated by a composition according to the present disclosure include conduits, production trees, manifolds, and jumpers, which can be used, for example, in underwater environments (e.g., submerged in the ocean). Low density articles, which may be spherical, made from the compositions disclosed herein may also be used in connection with any of these structures for deep water buoyancy. These may be useful, for example, for plugging a flowline at a certain depth.

Articles according to the present disclosure, which may be spherical, may also be useful as diverter balls for a variety of oil and gas well completion, well workover, and intervention applications. Diverter balls may be useful, for example, for sealing perforations in is formation that are accepting the most treatment fluid so that reservoir treatments can be diverted to other targeted portions of the hydrocarbon-bearing formation. Diverter balls used in connection with hydraulic fracturing may also be called frac balls.

Embodiments of the compositions disclosed herein that exhibit quick volume loss above a threshold isostatic pressure may be useful as syntactic foams for deep offshore oil well construction applications for control of annular pressure build-up with a wellbore. Using PMP and an appropriate selection of hollow glass microspheres and any compatibilizer and impact modifier, the threshold isostatic pressure at which a composition exhibits quick volume loss may be tailored as desired for a particular application.

SOME EMBODIMENTS OF THE DISCLOSURE

In a first embodiment, the present disclosure provides a composition comprising:
poly(4-methylpent-1-ene); and
hollow glass microspheres,
wherein the composition has a density of less than 0.8 grams per cubic centimeter.

In a second embodiment, the present disclosure provides the composition of the first embodiment, wherein the hollow glass microspheres have an average true density less than 0.5 grams per cubic centimeter.

In a third embodiment, the present disclosure provides the composition of the first or second embodiment, comprising at least twenty-five percent by weight of the hollow glass microspheres, based on the total weight of the composition.

In a fourth embodiment, the present disclosure provides the composition of any one of the first to third embodiments, wherein the composition has a density of up to 0.75 grams per cubic centimeter.

In a fifth embodiment, the present disclosure provides the composition of any one of the first to fourth embodiments, wherein a isostatic pressure at which ten percent by volume of the hollow glass microspheres collapses is in a range from about 70 megapascals to about 250 megapascals.

In a sixth embodiment, the present disclosure provides the composition of any one of the first to fifth embodiments, having an isostatic pressure resistance with less than five percent volume loss more than double the isostatic pressure at which ten percent by volume of the hollow ceramic microspheres collapses.

In a seventh embodiment, the present disclosure provides the composition of any one of the first to fifth embodiments, further comprising a polyolefin impact modifier that is chemically non-crosslinked and free of polar functional groups.

In an eighth embodiment, the present disclosure provides the composition of any one of the first to fifth or seventh embodiments, further comprising a polyolefin compatibilizer modified with polar functional groups.

In a ninth embodiment, the present disclosure provides the composition of the eighth embodiment, wherein the composition comprises an impact modifier, wherein the composition has an isostatic pressure resistance with greater than 25 percent volume loss substantially the same as the isostatic pressure at which ten percent by volume of the hollow glass microspheres collapses.

In a tenth embodiment, the present disclosure provides the composition any one of the first to ninth embodiments, wherein the impact modifier is an ethylene propylene elastomer, an ethylene octene elastomer, an ethylene propylene diene elastomer, an ethylene propylene octene elastomer, or a combination thereof, and wherein the compatibilizer is a maleic anhydride-modified polyolefin.

In an eleventh embodiment, the present disclosure provides the composition of any one of the first to tenth embodiments, wherein the poly(methyl pentene) is microcellular.

In a twelfth embodiment, the present disclosure provides an article comprising a solidified composition of any one of the first to eleventh embodiments.

In a thirteenth embodiment, the present disclosure provides the article of the twelfth embodiment, wherein the article is spherical.

In a fourteenth embodiment, the present disclosure provides the article of the thirteenth embodiment, wherein the article is a proppant.

In a fifteenth embodiment, the present disclosure provides the article of the thirteenth embodiment, wherein the article is a buoyancy device.

In a sixteenth embodiment, the present disclosure provides a conduit comprising the article of any one of the twelfth to fifteenth embodiments within.

In a seventeenth embodiment, the present disclosure provides the conduit of the sixteenth embodiment, further comprising oil within.

In an eighteenth embodiment, the present disclosure provides the conduit of the sixteenth or seventeenth embodiment, submerged at a depth of at least 100 meters.

In a nineteenth embodiment, the present disclosure provides a method of making an article, the method comprising injection molding the composition of any one of the first to eleventh embodiments to make the article.

In a twentieth embodiment, the present disclosure provides the method of the nineteenth embodiment, further comprising feeding the composition into a microcellular foam injection molding machine;
  injecting a supercritical fluid into the composition;
  blending the composition and the supercritical fluid at high pressure to form a blend; and
  injecting the blend into a molding tool.

In a twenty-first embodiment, the present disclosure provides a method of fracturing a subterranean geological formation penetrated by a wellbore, the method comprising:
  injecting into the wellbore penetrating the subterranean geological formation as fracturing fluid at a rate and pressure sufficient to form a fracture therein; and
  introducing into the fracture a plurality of articles according to the twelfth or thirteenth embodiment.

In a twenty-second embodiment, the present disclosure provides a method according to the twenty-first embodiment, wherein injecting the fracturing fluid and introducing the plurality of articles are carried out simultaneously, and wherein the fracturing fluid comprises the plurality of articles.

In a twenty-third embodiment, the present disclosure provides a method according to the twenty-first or twenty-second embodiment, wherein the fracturing is carried out at a depth of at least 500 meters.

In a twenty-fourth embodiment, the present disclosure provides a hydrocarbon-bearing formation penetrated by a wellbore, wherein the hydrocarbon-bearing formation comprises a fracture, and wherein the fracture includes an article of the twelfth or thirteenth embodiment within.

The following, specific, but non-limiting, examples will serve to illustrate the invention. In these examples, all amounts are expressed in parts per hundred resin (phr) unless specified otherwise. In these examples, N/M means "not measured".

EXAMPLES

TABLE 1

Materials

| Abbreviation | Material Description |
|---|---|
| PMP | Ploymethylpentene, a very low density thermoplastic (0.833 g/cc), commercially available from Mitsui Chemicals Inc., Tokyo, Japan under the trade designation "TPX RT18 XB" |
| C1 | 1 wt % Maleic anhydride modified homopolymer polypropylene under the trade name POLYBOND ® 3200 available from Chemtura Corporation (Philadelphia, PA). Melt flow rate (190 C./2.16 kg) 115 g/10 min |
| IM1 | Polyolefin elastomer (ethylene octene copolymer) with a nominal loose talc coating, commercially available under the trade designation Engage ® 8407 with a melt flow rate (190 C./2.16 kg) 30 g/min from Dow Chemical Company (Midland, M1) |
| GB1 | 3M ™ iM16K Hi-Strength Glass Bubbles with 16,000 psi isostatic crush strength, 20 micron average diameter and 0.46 g/cc true density commercially available from 3M Company, St. Paul, MN under the trade designation "3M iM16K Hi-Strength Glass Bubbles" |
| GB2 | 3M ™ XLD3000 Glass Bubbles with 3,000 psi isostatic crush strength, 30 micron average diameter and 0.30 g/cc true density available from 3M Company, St. Paul, MN |
| GB3 | 3M ™ XLD6000 Glass Bubble with 6,000 psi isostatic crush strength, 20 micron average diameter and 0.30 g/cc true density available from 3M Company, St. Paul, MN |
| GB4 | 3M ™ K46 Glass Bubbles with 6,000 psi isostatic crush strength, 40 micron average diameter and 0.46 g/cc true density available from 3M Company, St. Paul, MN |

Compounding Procedure

Samples were compounded in a co-rotating intermeshing 1 inch twin screw extruder (L/D: 25) equipped with 7 heating zones. Polymer pellets (PMP or PP) alone or in the presence of the impact modifier and compatibilizer were dry blended and fed in zone 1 via a resin feeder and then passed through a set of kneading blocks and conveying elements. The extrudate was cooled in a water bath and pelletized. Glass bubbles were side fed downstream in zone 4. At the point of glass bubble side feeding as well as for the rest of the downstream processing, high channel depth conveying elements (OD/ID: 1.75) were used. For polypropylene, the temperature in zone was set to 200° C. and all other zones to 220° C. For PMP, zone 1 was set to 260° C. and all others were set to 300° C. respectively. When impact modifier was used in the formulation, zone 1 temperature was decreased down to 150° C. to prevent build-up of rubber on the extruder inlet zone. The screw rotation speed was set to 250 rpm in both PP and PMP cases. The extrudate was cooled in a water bath and pelletized.

Injection Molding Procedure

All samples we molded using a BOY22D injection molding machine with a 28 mm general purpose barrel and screw manufactured by Boy Machines Inc., Exton, Pa. A standard ASTM mold with cavities for tensile, flex and impact bar was used for all molded parts. The injection molded specimens were kept on a lab bench at room temperature and under ambient conditions for at least 36 hours before performing any testing.

Density of the molded parts was determined using the following procedure. First, the molded parts were exposed to high temperature in an oven (Nabertherm® N300/14) in order to volatilize the polymer resin. The oven was set with a temperature ramp profile to run from 200° C. to 550° C. in 5 hours. After the temperature reached 550° C., it was kept constant for 12 hours. Weight percent of glass bubbles was calculated from the known mounts of molded part before and after burn process using below equation.

Weight % of Glass Bubbles=(Weight of Residual Inorganics After Burn)/(Weight of Molded Material Before Burn)×100

We then determine the density of the glass bubble residue ($d_{GB-res}$) using a helium gas pycnometer, AccuPcy 1330 from Micromeritics.

Finally, the molded part density is calculated from the known weight percent of glass bubble residue (W % GB), weight percent of polymer phase (1-w % G13), the density of glass bubble residue ($d_{GB-res}$) and the known polymer density ($d_{polymer}$) from supplier datasheet.

$$\rho_{molded\ part} = \left[\frac{1}{\left(\frac{W\%_{GB}}{d_{GB-res}}\right)+\left(\frac{W\%_{polymer}}{d_{polymer}}\right)}\right]$$

Density$_{molded\ part\ at\ zero\ process\ breakage}$ (g/cc) was also calculated assuming initial density of GBs used as the $d_{GB-res}$ value.

The amount of volume loss due to bubble breakage after compounding and injection molding (% Vol Loss in process) was calculated from the known density of the glass bubble residue ($d_{GB-res}$), the initial density of GBs ($d_{GB-initial}$), density of solid glass (2.54 g/cc) and using equation below.

$$\%\ Vol\ Loss\ in\ process = \left[\frac{\left(\frac{1}{(d_{GB-initial})}\right)-\left(\frac{1}{(d_{GB-res})}\right)}{\left(\frac{1}{(d_{GB-initial})}\right)-\left(\frac{1}{2.54}\right)}\right] \times 100$$

Mechanical properties of the injection-molded composites were measured using ASTM standard test methods listed in Table 2. An MTS frame with a 5kN load cell and tensile and 3 point bending grips were used for tensile and flexural properties, respectively. In tensile testing mode, the test procedure described in ASTM D-638-10 standard was followed, however no strain gauge was used, and instead, grip separation distance was used to determine the sample elongation. Tinius Olsen model IT503 impact tester and its specimen notcher were used to measure room temperature Notched Izod impact strength of the molded parts. A Tinius Olsen MP200 extrusion plastometer was used for melt flow index testing on samples. At least 5 different specimens from a given sample were tested in all tensile, flexural, and impact tests. Arithmetic average of the results were determined and reported in the following examples. The results were observed to be highly repeatable and the standard deviation in test results was observed to be in the range of 3-5% or lower. At least two different specimens were tested in melt flow index tests. The melt flow tests were observed to be highly repeatable with almost identical experimental results. Arithmetic average of the results were determined and reported in the following examples.

TABLE 2

| Property Test Methods | | |
|---|---|---|
| Test (Unit) | Abbr. | ASTM # |
| Tensile Modulus (MPa) @ 20° C. | TM | D-638-10 |
| Tensile Strength at yield (MPa) @ 20° C. | TS | D-638-10 |
| Elongation at break (%) | EL | D-638-10 |
| Notched Izod Impact @ °20 C. (J/m) | NI | D-256-10 |
| Flexural Modulus (MPa) | FM | D-790-10 |
| Flexural Strength at yield (MPa) | FS | D-790-10 |
| Melt Flow Index | MFI | D-1238-13 |

Bulk Isostatic Compression Testing of Injection Molded Parts

In this test, the molded plastic part is exposed to high isostatic pressure. The molded plastic part is placed directly into the oil containing pressure chamber. Therefore, the working pressure around the GBs is the plastic resin which in turn is pressurized by the surrounding oil. The amount of plastic part that is put in the pressure chamber contains ~10 ml of GBs.

Once the sample is in the pressure chamber, it is pressurized to a predetermined pressure while recording both pressure and volume. This process is repeated to get a second set of pressure-volume data, and both data sets are plotted as pressure vs. volume (P vs. V) curves. The initial pressurization is known as the collapse curve (P versus V1), and the second pressurization provides the system compression curve (P versus V2). The two curves are used to determine the percentage of collapsed GBs in the test.

$$V_1 = V_{compression}$$

$$V_2 = V_{collapse}$$

$V_T$ refers to the total volume collapse calculated by the difference in the collapse and compression curve values at zero pressure.

$$V_T = V_{total(P=0)}$$

$V_P$ is the void volume collapsed at that pressure and is calculated by $$V_P = V_T - (V_1(P) - V_2(P))$$

where $V_1(P)$ and $V_2(P)$ are the volume values of the compression and collapse curves, respectively, at the pressure of interest.

Since the interior glass bubble void space is the major contributor to volume loss in the process of molded bar pressurization, the original volume (Vv) of the glass bubble interior void space in the molded part is found by subtracting the volume of the wall material ($V_m$) from the volume occupied by the GBs ($V_{ap}$) in the molded part.

$$Vv = Vap - Vm$$

Then, the percent volume survival ($V_{survival}$) at pressure P is found as $$\% V_{survival}(P) = 1 - [100 \times (V_P/V_v)]$$

$$\% V_{survival}(P) = 1 - [100 \times (V_{total(P=0)} - (V_1(P) - V_2(P))/(V_{ap} - V_m)]$$

Figure 2:
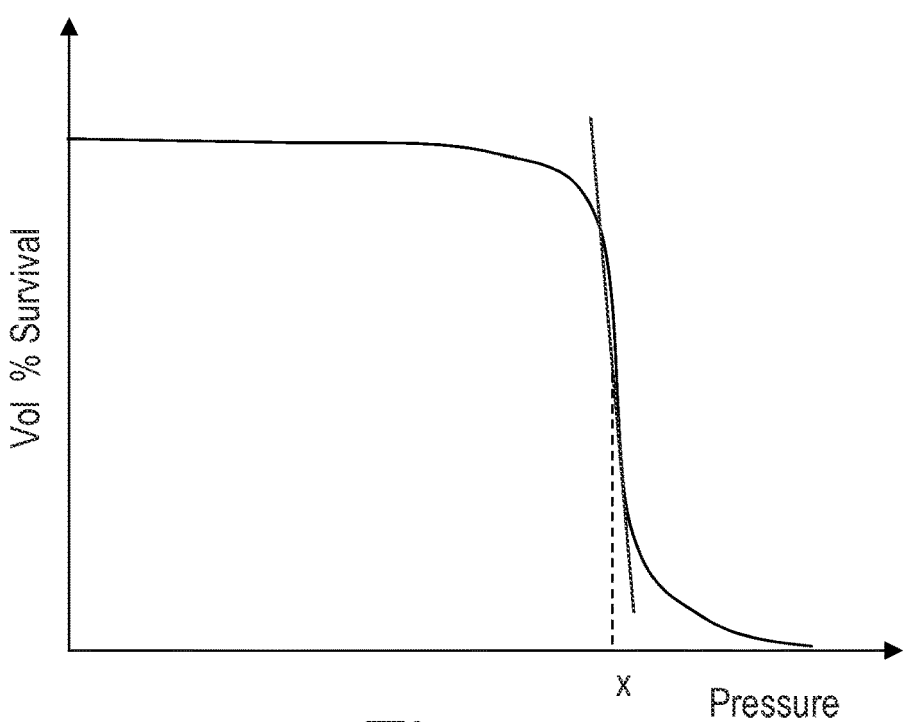
FIG. 2 is a graph of volume loss vs. pressure used to measure isostatic pressure resistance for a different type of sample in the Examples.

In our examples, a tangent is drawn to the volume loss curve and the pressure value at the midpoint of the tangent is taken as the pressure point, x, at which considerable volume loss occurs. This is shown in FIGS. 1 and 2, with FIG. 1 exhibiting a more gradual volume loss compared to that in FIG. 2 where the volume loss happens more instantly and at a higher pressure value.

Comparative Example A and Examples 1-4 Solid Syntactic Polymethylpentene Formulations and a compatibilizer. Note that the introduction of 20.9 wt % elastomeric impact modifier softens the matrix and the composite isostatic pressure resistance reduces to 16000 psi which is that of the GB1 itself. In other words, the glass bubble phase becomes the strength determining phase. 16000 psi resistance at a density of 0.69 g/cc is still very useful for various oil and gas applications. In addition, EX4 exhibits very high MFI indicating easy flow for injection molding application.

Example 5 and Comparative Example B Supercritically Foamed Syntactic Polymethylpentene Formulations Another method of density reduction is via supercritical foaming and combination of supercritical foaming with glass bubbles. CEA and EX1 compounded materials were molded in a MuCell® enabled Engel injection molding machine (ES200/100TL equipped with SCF system Model # TR 3.5000G using $CO_2$ as the supercritical gas) to produce CEB and EX5. Table 2 compares supercritically foamed material against unfoamed solid syntactic material. Note that the volume loss in CEB (supercritically foamed only) occurs at a much lower pressure after which it stabilizes indicating

TABLE 3

| Solid Syntactic Polymethylpentene Formulations | | | | | | | | | | |
|---|---|---|---|---|---|---|---|---|---|---|
| | CEA | | EX1 | | EX2 | | EX3 | | EX4 | |
| | Wt % | Vol % | Wt % | Vol % | Wt % | Vol % | Wt % | Vol % | Wt % | Vol % |
| PMP | 100 | 100 | 89.6 | 84.3 | 79.5 | 71.4 | 71.1 | 60.5 | 44.8 | 37.9 |
| GB1 | — | — | 10.4 | 15.7 | 20.5 | 28.6 | 28.9 | 39.5 | 29.9 | 41.7 |
| C1 | — | — | — | — | — | — | — | — | 4.5 | 3.4 |
| IM1 | — | — | — | — | — | — | — | — | 20.9 | 16.9 |
| % Vol Loss in Process | | | | | | | | | | |
| Density$_{GB\text{-}residue}$ (g/cc) | | | | | | | | | | |
| Density$_{molded\ part}$ (g/cc) | 0.825 | | 0.776 | | 0.741 | | 0.702 | | 0.699 | |
| Density$_{molded\ part\ at\ zero\ process\ breakage}$ (g/cc) calculated | 0.825 | | 0.762 | | 0.710 | | 0.672 | | 0.674 | |
| TS (MPa) | 24.4 | | 17.4 | | 15.2 | | 14.0 | | 10.9 | |
| TM (MPa) | 1235 | | 1461 | | 1657 | | 1911 | | 1124 | |
| EL (MPa) | 3.9 | | 1.8 | | 1.1 | | 0.8 | | 1.3 | |
| FS (MPa) | 35.8 | | 30.4 | | 22.8 | | 20.7 | | 19.2 | |
| FM (MPa) | 1055 | | 1325 | | 1523 | | 1618 | | 1036 | |
| NI (J/m) notched | 14.1 | | 12.3 | | 12.4 | | 11.9 | | 10.9 | |
| UNI (J/m) | 111 | | 111 | | 32.2 | | 23.4 | | 90 | |
| MFI (260° C. 5 kg) | 28 | | 37 | | 10 | | 15 | | 68 | |
| MFI/density (1/g(cc)) | 33.9 | | 47.7 | | 13.5 | | 21.4 | | 97.3 | |
| Pressure Point x (psi) | — | | — | | — | | >25000 (test halted at 25000 due to upper limit) | | 16157 | |

The PMP/GB1 composite syntactic material of EX3 exhibits 25000+ PSI isostatic pressure without any volume loss with more than 90% glass bubble survival. Since GB1 isostatic crush strength is around 16000 PSI at 90% survival, this shows that the PMP matrix reinforces the composite and increases the compressive isostatic pressure resistance.

EX4 was developed to improve the impact resistance of EX3 by introducing a combination of an impact modifier that the cells created by the supercritical foaming are totally compressed. EX5, on the other hand, contains both glass bubbles and supercritically foamed cells and the volume loss occurs at a higher pressure than that observed in CEB. Low density articles made from EX5 are useful for low density articles that require higher compressive pressure resistance than that can be achieved with supercritically foamed articles only.

TABLE 4

Supercritically Foamed Syntactic Polymethylpentene Formulations

|  | CEA PMP only | | EX1 PMP plus glass bubbles | | CEB PMP supercritically foamed | | EX5 PMP and glass bubbles supercritically foamed | |
| --- | --- | --- | --- | --- | --- | --- | --- | --- |
|  | Wt % | Vol % | Wt % | Vol % | Wt % | Vol % | Wt % | Vol % |
| PMP | 100 | 100 | 90 | 83 | 100 | 88.3 | 90 | 79.6 |
| GB1 | — | — | 10 | 17 | — | — | 10 | 14.6 |
| C1 | — | — | — | — | — | 11.7 | — | 5.8 |
| IM1 | — | — | — | — | — | — | — | — |
| Density | 0.825 | | 0.769 | | 0.730 | | 0.70 | |
| TS (MPa) | 24.4 | | 17.4 | | 19.5 | | 15.3 | |
| TM (MPa) | 1235 | | 1461 | | 1120 | | 1330 | |
| EL (MPa) | 3.9 | | 1.8 | | 5.0 | | 5.3 | |
| FS (MPa) | 35.8 | | 30.4 | | 34 | | 30.0 | |
| FM (MPa) | 1055 | | 1325 | | 1204 | | 1400 | |
| NI (J/m) notched | 14.1 | | 12.3 | | 17.7 | | 24.0 | |
| UNI (J/m) | 111 | | 111 | | 100 | | 130 | |
| Pressure Point x (psi) | — | | — | | 1250 | | 1875 | |

Figure 3:
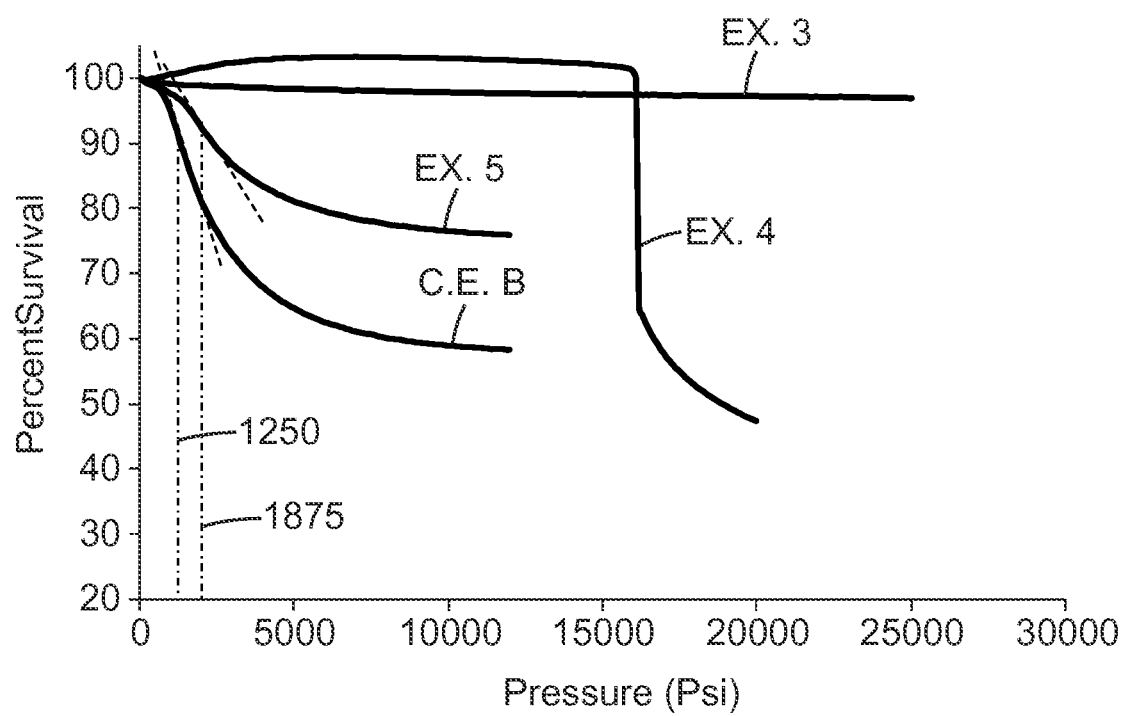
FIG. 3 is a graph showing isostatic pressure resistance for Examples CEB, EX3, EX4, and EX5.

Isostatic pressure resistance for Examples CEB, EX3, EX4 and EX5 is Shown in FIG. 3.

Example 6, 7 and Comparative Examples CEC, CED and CEE

Polypropylene is another low density polymer that could be used for pressure resistant low density injection molded article. Such examples are shown in CEC, CED and CEE. However, as shown in EX6, lower densities can be achieved with a higher isostatic pressure strength with PMP material than that can be achieved with PP material (compare EX6 with CEC). In order to achieve comparable pressure strength, one needs to select higher strength glass bubbles which increase the density of the molded part (compare CEC to CED). Further increase of GB content decreases the isostatic pressure strength. Without being bound by theory, it is speculated that increased loading of GBs increases the statistical possibility of the GBs being in very close proximity to each other and prematurely collapsing under environmental pressure when there is not enough buffer polymer matrix wetting between the glass bubbles. In addition, higher loadings of GBs decrease flowability of the compound as shown by MFI/density values.

TABLE 5

|  | EX6 | | CEC | | EX7 | | CED | | CEE | |
| --- | --- | --- | --- | --- | --- | --- | --- | --- | --- | --- |
|  | Wt % | Vol % | Wt % | Vol % | Wt % | Vol % | Wt % | Vol % | Wt % | Vol % |
| PMP | 87.1 | 77.1 | — | — | 66.3 | 50.7 | — | — | — | — |
| PP | — | — | 85.5 | 72.3 | — | — | 81.4 | 75.0 | 69.5 | 62.1 |
| GB3 | 12.9 | 22.9 | 14.5 | 27.7 | 22.1 | 37.3 | — | — | — | — |
| GB4 | — | — | — | — | — | — | 18.6 | 25.0 | 30.5 | 37.9 |
| C1 | — | — | — | — | 3.1 | 2.3 | — | — | — | — |
| IM1 | — | — | — | — | 12.5 | 9.7 | — | — | — | — |
| % Vol Loss in Process | 28 | | 25 | | 24.9 | | 29.7 | | 34.0 | |
| Density$_{GB\text{-}residue}$ (g/cc) | 0.411 | | 0.398 | | 0.397 | | 0.616 | | 0.646 | |
| Density$_{molded\ part}$ (g/cc) | 0.730 | | 0.761 | | 0.671 | | 0.829 | | 0.804 | |
| Density$_{molded\ part\ at\ zero\ process\ breakage}$ (g/cc) calculated | 0.673 | | 0.698 | | 0.622 | | 0.764 | | 0.697 | |
| TS (MPa) | 16.6 | | 12.8 | | 14.4 | | 12.4 | | 10.5 | |
| TM (MPa) | 1590 | | 1476 | | 1391 | | 1560 | | 1475 | |
| EL (MPa) | 1.3 | | 1.0 | | 1.27 | | 1.0 | | — | |
| FS (MPa) | 26.5 | | 22.4 | | 21.0 | | 21.4 | | 18.0 | |
| FM (MPa) 1% secant | 1431 | | 1375 | | 1350 | | 1340 | | 1600 | |
| NI (J/m) notched | 11.0 | | 20 | | 11.9 | | 25.5 | | 18.5 | |
| UNI (J/m) | 55.1 | | — | | 61.1 | | — | | — | |
| MFI (260° C. 5 kg) | 24.0 | | 12.2 | | 60.4 | | 16.2 | | — | |
| MFI/density (1/g(cc)) | 33.0 | | 16.0 | | 90.0 | | 19.5 | | — | |
| Pressure Point x (psi) | 17550 | | 13000 | | 8150 | | 16500 | | 14500 | |

This disclosure is not limited to the above-described embodiments but is to be controlled by the limitations set forth in the following claims and any equivalents thereof. This disclosure may be suitably practiced in the absence of any element not specifically disclosed herein.

What is claimed is:

1. A composition comprising:
   poly(4-methylpent-1-ene); and
   hollow glass microspheres, wherein the composition has a density of less than 0.8 grams per cubic centimeter, and wherein the poly(4-methylpent-1-ene) is microcellular.

2. The composition of claim 1, wherein the hollow glass microspheres are present in a range of ten percent by weight to thirty-five percent by weight, based on the total weight of the composition.

3. The composition of claim 1, wherein the hollow glass microspheres have an average true density less than 0.5 grams per cubic centimeter.

4. The composition of claim 1, comprising up to twenty-five percent by weight of the hollow glass microspheres, based on the total weight of the composition.

5. The composition of claim 1, wherein the composition has a density of up to 0.75 grams per cubic centimeter.

6. The composition of claim 1, wherein an isostatic pressure at which ten percent by volume of the hollow glass microspheres collapses is in a range from about 70 megapascals to about 250 megapascals.

7. The composition of claim 1, having an isostatic pressure resistance with less than five percent volume loss more than double than the isostatic pressure at which ten percent by volume of the hollow glass microspheres collapses.

8. The composition of claim 1, further comprising a polyolefin impact modifier that is chemically non-cross-linked and free of polar functional groups.

9. The composition of claim 1, further comprising a polyolefin compatibilizer modified with polar functional groups.

10. The composition of claim 9, wherein the composition comprises an impact modifier, wherein the composition has an isostatic pressure resistance with greater than 25 percent volume loss substantially the same as the isostatic pressure at which ten percent by volume of the hollow glass microspheres collapses.

11. The composition of claim 1, further comprising an impact modifier and a compatibilizer, wherein the impact modifier is an ethylene propylene elastomer, an ethylene octene elastomer, an ethylene propylene diene elastomer, an ethylene propylene octene elastomer, or a combination thereof, and wherein the compatibilizer is a maleic anhydride-modified polyolefin.

12. An article comprising a solidified composition of claim 1.

13. The article of claim 12, wherein the article is spherical.

14. The article of claim 13, wherein the article is a buoyancy device.

15. The article of claim 13, wherein the article is a proppant.

16. A method of fracturing a subterranean geological formation penetrated by a wellbore, the method comprising:
   injecting into the wellbore penetrating the subterranean geological formation a fracturing fluid at a rate and pressure sufficient to form a fracture therein; and
   introducing into the fracture a plurality of articles according to claim 15.

17. A conduit comprising the article of claim 12 within.

18. A method of making an article, the method comprising injection molding the composition of claim 1 to make the article.

19. A method of making an article, the method comprising feeding the composition of claim 1 into a microcellular foam injection molding machine;
   injecting a supercritical fluid into the composition;
   blending the composition and the supercritical fluid at high pressure to form a blend; and
   injecting the blend into a molding tool.

20. The composition of claim 1, comprising less than twenty percent by weight of the hollow glass microspheres, based on the total weight of the composition.

* * * * *

UNITED STATES PATENT AND TRADEMARK OFFICE
CERTIFICATE OF CORRECTION

PATENT NO. : 10,590,265 B2
APPLICATION NO. : 15/109373
DATED : March 17, 2020
INVENTOR(S) : Baris Yalcin et al.

It is certified that error appears in the above-identified patent and that said Letters Patent is hereby corrected as shown below:

On the Title Page

Line 1 of the Title, delete "POLY (METHYLPENTENE)" and insert
-- POLY(METHYLPENTENE) --, therefor.

In the Specification

Column 1
Line 1, delete "POLY (METHYLPENTENE)" and insert -- POLY(METHYLPENTENE) --, therefor.

Column 3
Line 43, delete "as" and insert -- a --, therefor.

Column 4
Line 5, delete "towering" and insert -- lowering --, therefor.
Line 31, delete "particle," and insert -- particle --, therefor.

Column 5
Line 34, delete "heads" and insert -- beads --, therefor.

Column 6
Lines 29-30, delete "propylene;" and insert -- propylene, --, therefor.

Column 7
Line 32, delete "all" and insert -- an --, therefor.
Line 56, delete "is" and insert -- in --, therefor.

Column 8
Line 7, delete "flew" and insert -- flow --, therefor.
Line 8, delete "flow" and insert -- Flow --, therefor.

Signed and Sealed this
Twenty-fourth Day of November, 2020

Andrei Iancu
*Director of the United States Patent and Trademark Office*

Line 59, delete "mate" and insert -- create --, therefor.

Column 9
Line 56, delete "Coupling," and insert -- Coupling --, therefor.

Column 10
Line 57, delete "agents" and insert -- agents, --, therefor.

Column 11
Line 4, delete "1.8" and insert -- 18 --, therefor.
Line 8, delete "about." and insert -- about --, therefor.
Line 26, delete "a" and insert -- at --, therefor.
Line 26, delete "0.8" and insert -- 0.8, --, therefor.

Column 12
Line 67, after "hydrocarbons" insert -- are --.

Column 13
Line 56, delete "is" and insert -- a --, therefor.

Column 15
Line 62, delete "as" and insert -- a --, therefor.

Column 16
Line 16, delete "following," and insert -- following --, therefor.

Columns 15-16
Line 3, Table 1, delete "Ploymethylpentene," and insert -- Polymethylpentene, --, therefor.
Line 11, Table 1, delete "g/min" and insert -- g/10 min --, therefor.
Line 12, Table 1, delete "M1)" and insert -- MI) --, therefor.
Line 20, Table 1, delete "Bubble" and insert -- Bubbles --, therefor.

Column 16
Line 63, delete "zone" and insert -- zone 1 --, therefor.

Column 17
Line 5, delete "we" and insert -- were --, therefor.
Line 22, delete "mounts" and insert -- amounts --, therefor.
Line 33, delete "G13)," and insert -- GB), --, therefor.

Lines 37-41, delete " $\rho_{molded\ part} = \left[ \dfrac{1}{\left(\dfrac{W\%_{GB}}{d_{GB-res}}\right) + \left(\dfrac{W\%_{polymer}}{d_{polymer}}\right)} \right].$ " and insert $$\rho_{molded\ part} = \left[ \cfrac{1}{\left(\cfrac{W\%_{GB}}{d_{GB-res}}\right) + \left(\cfrac{W\%_{polymer}}{d_{polymer}}\right)} \right]$$

--, therefor.

Column 21
Line 24, delete "EX4" and insert -- EX4, --, therefor.